United States Patent
Liu

(10) Patent No.: US 11,366,365 B2
(45) Date of Patent: Jun. 21, 2022

(54) ARRAY SUBSTRATE AND DISPLAY PANEL

(71) Applicant: HKC CORPORATION LIMITED, Guangdong (CN)

(72) Inventor: Zhongnian Liu, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 17/272,932

(22) PCT Filed: Dec. 6, 2018

(86) PCT No.: PCT/CN2018/119593
§ 371 (c)(1),
(2) Date: Mar. 3, 2021

(87) PCT Pub. No.: WO2020/087663
PCT Pub. Date: May 7, 2020

(65) Prior Publication Data
US 2021/0325742 A1    Oct. 21, 2021

(30) Foreign Application Priority Data
Oct. 29, 2018  (CN) ......................... 201821760058.6

(51) Int. Cl.
*G02F 1/1362*  (2006.01)
*G02F 1/1343*  (2006.01)
*G02F 1/1337*  (2006.01)

(52) U.S. Cl.
CPC .. *G02F 1/136209* (2013.01); *G02F 1/134309* (2013.01); *G02F 1/136218* (2021.01); *G02F 1/136222* (2021.01); *G02F 1/133707* (2013.01); *G02F 1/136213* (2013.01)

(58) Field of Classification Search
None
See application file for complete search history.

(56) References Cited

U.S. PATENT DOCUMENTS

| | | |
|---|---|---|
| 2010/0123845 A1 | 5/2010 | Kim et al. |
| 2017/0160601 A1* | 6/2017 | Kang ................... G02F 1/13624 |
| 2017/0322462 A1* | 11/2017 | Lee ........................ H01L 27/124 |

FOREIGN PATENT DOCUMENTS

| | | |
|---|---|---|
| CN | 106707650 A | 5/2017 |
| CN | 107153309 A | 9/2017 |

OTHER PUBLICATIONS

International Search Report in corresponding PCT Application No. PCT/CN2018/119593, dated Jul. 2, 2019 and Written Opinion of the International Searching Authority in corresponding PCT Application No. PCT/CN2018/119593, dated Jul. 2, 2019.

* cited by examiner

*Primary Examiner* — Richard H Kim

(57) ABSTRACT

An array substrate of this application includes: a first common electrode, including a shield plate; a pixel electrode, insulated from the first common electrode and including a frame surrounded by an orthographic projection of the shield plate and a branch surrounded by the frame. The branch is connected to the frame. The frame includes a first side portion and a second side portion separated from each other. The first side portion is connected to the branch. The second side portion is located between the first side portion and the shield plate. Optionally, the first common electrode further includes a capacitor plate connected to the shield plate, and a storage capacitor is formed by the capacitor plate and the second side portion.

12 Claims, 4 Drawing Sheets

ARRAY SUBSTRATE AND DISPLAY PANEL

CROSS-REFERENCE TO RELATED APPLICATIONS

This application is the National Stage of International Application No. PCT/CN2018/119593, filed on Dec. 6, 2018, which claims the benefit of Chinese Patent application No. 201821760058.6, filed on Oct. 29, 2018 and entitled "Array Substrate and Display Panel", the entirety of which is hereby incorporated herein by reference.

FIELD

This application relates to the field of display technology, and in particular to an array substrate and a display panel.

BACKGROUND

The statements here only provide background information related to this application, and do not necessarily constitute prior art.

With the development of display technology, various liquid crystal display devices (such as LCD TVs) are widely used. The display panel usually includes an array substrate and a color filter substrate arranged oppositely. Liquid crystal molecules are filled between the array substrate and the color filter substrate.

The array substrate is provided with a pixel electrode located inside the sub-pixel and a first common electrode located at the edge of the sub-pixel. The color filter substrate is provided with a second common electrode having the same potential as the first common electrode. The pixel electrode is configured to supply power for the light-emitting display of the sub-pixels. The first common electrode includes a shield plate, and there is no voltage difference between the shield plate and the second common electrode, so that all the liquid crystal molecules between the two stand up and cover the light source, so that the edge of the sub-pixel is displayed in a dark state.

When the display panel is working, the electric field on the pixel electrode is easily affected by the electric field on the first common electrode (shield plate), and dark lines are formed at the edges of the sub-pixels, thereby affecting the transmittance of the panel.

SUMMARY

According to various embodiments of this application, an array substrate and a display panel capable of improving the edge shading of each sub-pixel are provided.

An array substrate, including:

a first common electrode, including a shield plate; and a pixel electrode, insulated from the first common electrode and comprising a frame surrounded by an orthographic projection of the shield plate and a branch surrounded by the frame, the branch being connected to the frame, the frame including a first side portion and a second side portion separated from each other, the first side portion being connected to the branch, the second side portion being located between the first side portion and the shield plate.

In one of the embodiments, the first common electrode further includes a capacitor plate connected to the shield plate, and a storage capacitor is formed by the capacitor plate and the second side portion.

In one of the embodiments, the frame defines a through hole, and the first side portion and the second side portion are located on two opposite sides of the through hole.

In one of the embodiments, a number of the through hole is one.

In one of the embodiments, a number of the through hole is greater than one.

In one of the embodiments, the pixel electrode further includes a main stem, two sides of the main stem is connected with the branch, an internal area of the pixel electrode is divided into a plurality of domains by the main stem, extension directions of branches in the plurality of domains are different, and a frame corresponding to each of the plurality of domains defines the through hole.

In one of the embodiments, the through hole in the frame corresponding to each of the plurality of domains has a same length as the frame.

In one of the embodiments, one of the plurality of domains corresponds to one through hole.

In one of the embodiments, one of the plurality of domains corresponds to a plurality of through holes.

In one of the embodiments, the through hole is arranged opposite to the branch.

In one of the embodiments, one through hole is arranged opposite to one corresponding branch.

In one of the embodiments, one through hole is arranged opposite to a plurality of corresponding branches.

In one of the embodiments, a number of the through hole is greater than one, and each through hole located on two sides of the first side portion has a same distance from a corresponding branch.

In one of the embodiments, a number of the through hole is greater than one, and a distance between the first side portion and the second side portion located on both sides of each through hole is the same.

In one of the embodiments, only a part of the frame is surrounded by the shield plate.

In one of the embodiments, all of the frame is surrounded by the shield plate.

In one of the embodiments, a number of the through hole is greater than one, the first common electrode further includes a capacitor plate connected to the shield plate, and a part of the frame between each through hole is configured to form a storage capacitor with the capacitor plate.

In one of the embodiments, the second side portion is further configured to form a storage capacitor with the capacitor plate.

An array substrate, including:

a first common electrode, including a shield plate and a capacitor plate connected to each other; and a pixel electrode, insulated from the first common electrode and comprising a frame, a main stem, and a branch, the main stem and the branch being connected to the frame and surrounded by the frame;

where the frame includes a first side portion, a second side portion, and a plurality of through holes, the first side portion and the second side portion are located on two opposite sides of each of the plurality of through holes, the first side portion is connected to the branch, the second side portion is located between the first side portion and the shield plate, and a storage capacitor is formed by the second side portion and the capacitor plate; and where the main stem includes a first stem and a second stem, the first stem is crossed with the second stem to divide an internal area of the pixel electrode into four domains of equal size; the branch is distributed in each of the four domains and connected to the main stem and the frame, and extension directions of branches in the four domains are different.

A display panel, including:

a liquid crystal molecule, a color film substrate and an array substrate;

where the array substrate includes:

a first common electrode, including a shield plate; and a pixel electrode, insulated from the first common electrode and comprising a frame surrounded by an orthographic projection of the shield plate and a branch surrounded by the frame, the branch being connected to the frame, the frame including a first side portion and a second side portion separated from each other, the first side portion being connected to the branch, the second side portion being located between the first side portion and the shield plate;

where the array substrate is arranged opposite to the color filter substrate, the liquid crystal molecule is located between the color filter substrate and the array substrate, the color filter substrate includes a second common electrode, and the second common electrode is equipotential with the first common electrode.

In the above array substrate, the second side portion of the frame of the pixel electrode is located between the first side portion and the shield plate. While the first side portion connected to the branch is separated from the second side portion. Therefore, the electric field of the shield plate mainly affects the electric field on the second side portion, which effectively reduces the influence of the electric field of the shield plate on the electric field on the branch configured to make the liquid crystal molecules transmit light, thereby effectively improving the edge shadow phenomenon.

The details of one or more embodiments of this application are set forth in the following drawings and description. Other features, purpose and advantages of this application will become apparent from the description, drawings and claims.

BRIEF DESCRIPTION OF THE DRAWINGS

In order to better describe and illustrate the embodiments and/or examples of those inventions disclosed herein, one or more drawings may be referred to. The additional details or examples used to describe the drawings should not be considered as limiting the scope of any of the disclosed invention, the currently described embodiments and/or examples and the best mode of these inventions currently understood.

DETAILED DESCRIPTION OF THE EMBODIMENTS

In order to make the purpose, technical solutions and advantages of this application clearer, the following further describes this application in detail with reference to the accompanying drawings and embodiments. It should be understood that the specific embodiments described herein are only used to explain this application, and are not used to limit this application.

The array substrate and the display panel provided by this application may be applied to liquid crystal display devices such as liquid crystal televisions.

Figure 1:
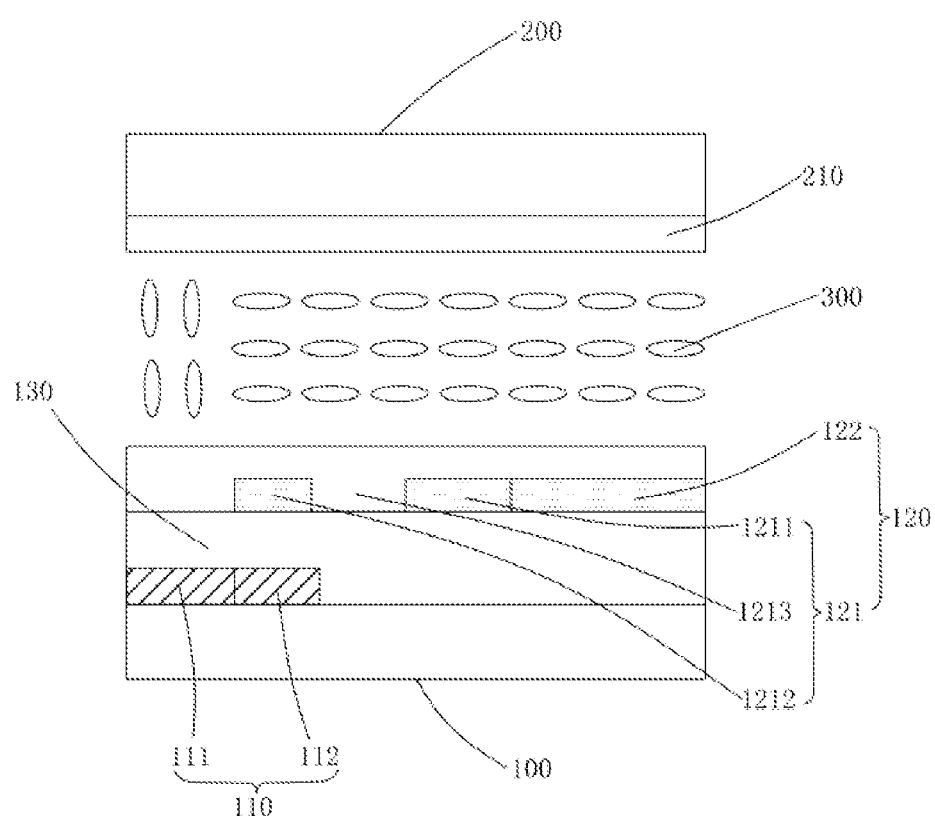
FIG. 1 is a schematic diagram of a display panel according to an embodiment.

In an embodiment, as shown in FIG. 1, a display panel is provided, which includes an array substrate 100, a color filter substrate 200 and liquid crystal molecules 300. The array substrate 100 and the color filter substrate 200 are arranged opposite to each other. The liquid crystal molecules 300 are located between the array substrate 100 and the color filter substrate 200. The array substrate 100 includes a first common electrode 110, a pixel electrode 120, an insulating layer 130, and the like. The first common electrode 110 and the pixel electrode 120 are insulated from each other by the insulating layer 130 therebetween. The color filter substrate 200 includes a second common electrode 210. The second common electrode 210 and the first common electrode 110 have the same potential.

Specifically, the display panel includes a plurality of pixel units. Each pixel unit has multiple sub-pixels, for example, a red sub-pixel R, a green sub-pixel G, and a blue sub-pixel B. The color filter substrate 200 may have color resist layers including color resists of different colors. The color of each sub-pixel may be realized by color resists of different colors.

Each pixel electrode 120 is disposed opposite to a part of the second common electrode 210. Each sub-pixel corresponds to a pixel electrode 120. A plurality of sub-pixels may share one second common electrode 210. The sub-pixel may include a pixel electrode 120, a second common electrode 210 opposite to the pixel electrode 120, and liquid crystal molecules 300 therebetween. The liquid crystal molecules 300 in each sub-pixel may be deflected when a voltage difference is formed between the pixel electrode 120 and the second common electrode 210, thereby making each sub-pixel transparent and display.

The array substrate 100 may further include a thin film transistor. The pixel electrode 120 is electrically connected to a drain electrode of the thin film transistor to charge the sub-pixel. The second common electrode 210 is electrically connected to the first common electrode 120 at the same potential, so that the second common electrode 210 may be supplied with power through the first common electrode 120.

The first common electrode 110 includes a shield plate 111. The shield plate 111 is located between the sub-pixels, and is opposite to the second common electrode 210 between the sub-pixels. The first common electrode 110 and the second common electrode 210 are at the same potential, and the shield plate 111 is a part of the first common electrode 110. Therefore, the shield plate 111 and the second common electrode 210 between the sub-pixels has the same potential, that is, there is no voltage difference between the two. The liquid crystal molecules 300 between the shield plate 111 and the second common electrode 210 between the sub-pixels stand along the equipotential line, thereby shielding the light source, so that the sub-pixels are displayed in a dark state. However, the mutual influence between the electric fields also causes the electric field on the shield plate 111 to affect the electric field on the pixel electrode 120 nearby.

Figure 2:
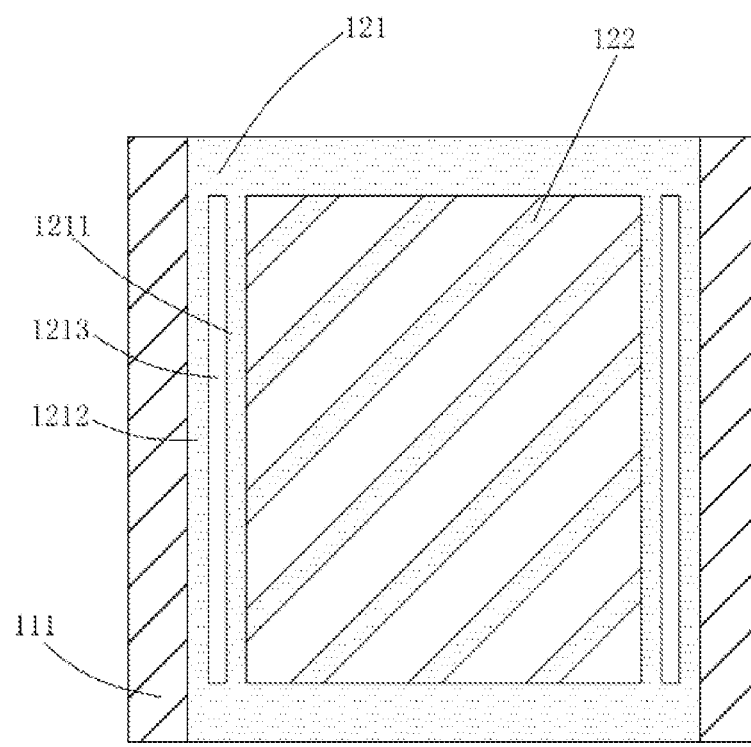
FIGS. 2 to 4 are schematic diagrams of an array substrate according to different embodiments.
Figure 3:
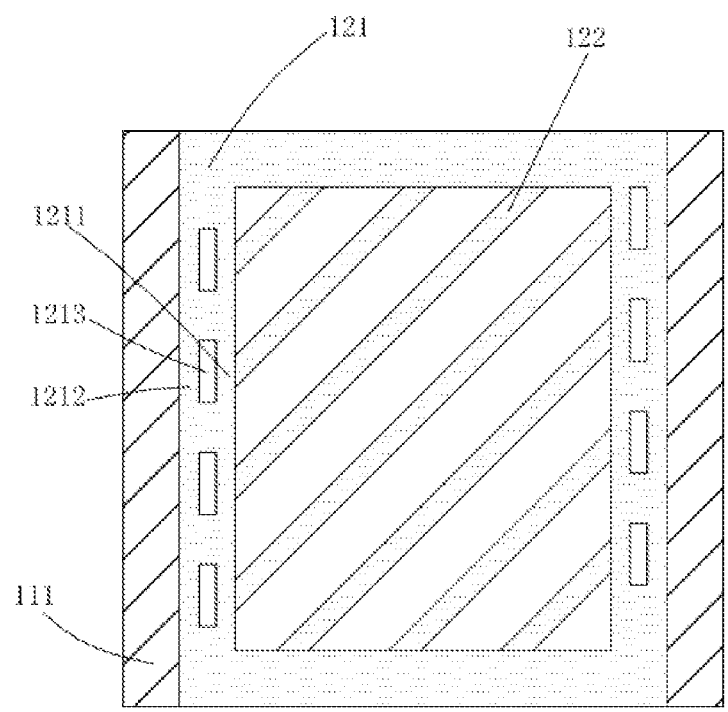

Referring to FIG. 2, the pixel electrode 120 includes a frame 121 and a branch 122. The frame 121 surrounds the branch 122. The branch 122 is connected to the frame 121. The frame 121 is surrounded by an orthographic projection of the shield plate 111. The shield plate 111 may only surround a part of the frame 121 (refer to FIG. 2 to FIG. 4), or may surround the entire frame 121 (not shown) to form an enclosure structure, which is not limited in this application.

When the display panel is performing normal display, the electric field generated by the voltage on the branch 122 guides the liquid crystal molecules 300 between the branch 122 and its surrounding area (for example, when a number of branch 122 is multiple, the area between the branches) and the second common electrode 210 to be deflected and transmit light. A field strength between the branch 122 and the second common electrode 210 is $E_1$, and a field strength between the surrounding area of the branch 122 and the second common electrode 210 is $E_2$. Since there is no voltage on the surrounding area, $E_2$ is weaker than $E_1$. Therefore, when the electric field generated by the voltage at the branch 122 close to the shield plate 111 is weakened by the electric field generated by the voltage on the shield plate 111, the field strength $E_2$ between the surrounding area and the second common electrode 210 becomes weaker, which causes the corresponding liquid crystal molecules 300 to be easily deflected and disordered and cannot transmit light normally, which makes the edges of sub-pixels prone to generate dark lines, thereby affecting the transmittance of the panel.

In an embodiment of this application, the frame 121 includes a first side portion 1211 and a second side portion 1212. The second side portion 1212 is located between the first side portion 1211 and the shield plate 111. Therefore, the second side portion 1212 is easily affected by the electric field on the shield plate 111. The first side portion 1211 and the second side portion 1212 are separated from each other. Therefore, the influence of the electric field on the shield plate 111 mainly acts on the second side portion 1212, but has little influence on the first side portion 1211. The branch 122 is connected to the first side portion 1211. Therefore, the influence of the electric field of the shield plate 111 on the electric field on the branch 122 that is configured to make the liquid crystal molecules 300 transmit light is effectively reduced, thereby effectively improving the edge shadow phenomenon.

In an embodiment, referring to FIGS. 1 and 2 at the same time, the first common electrode 110 further includes a capacitor plate 112 connected to the shield plate 111. The capacitor plate 112 and the second side portion 1212 form a storage capacitor. The storage capacitor may keep the voltage on the pixel electrode 120 continuous during the display process. Therefore, the arrangement of the second side portion 1212 not only reduces the influence of the electric field on the shield plate 111 on the electric field on the branch 122, and effectively suppresses dark lines; at the same time, it also enables a continuous voltage supply on the pixel electrode 120 to effectively avoid displaying exceptions.

In an embodiment, the frame 121 has one or more through holes 1213. The first side portion 1211 and the second side portion 1212 are separated from two opposite sides of the through hole 1213, thereby conveniently and effectively separating the first side portion 1211 and the second side portion 1212 from each other. Certainly, in an embodiment of this application, the form in which the first side portion 1211 and the second side portion 1212 are separated from each other is not limited to the formation of the above-mentioned through-hole isolation, and it may also be implemented in other ways (for example, the two may be connected on two sides of a connection part, and the two and the connection part form an "H" shape and then separate), this application does not limit this.

Figure 4:
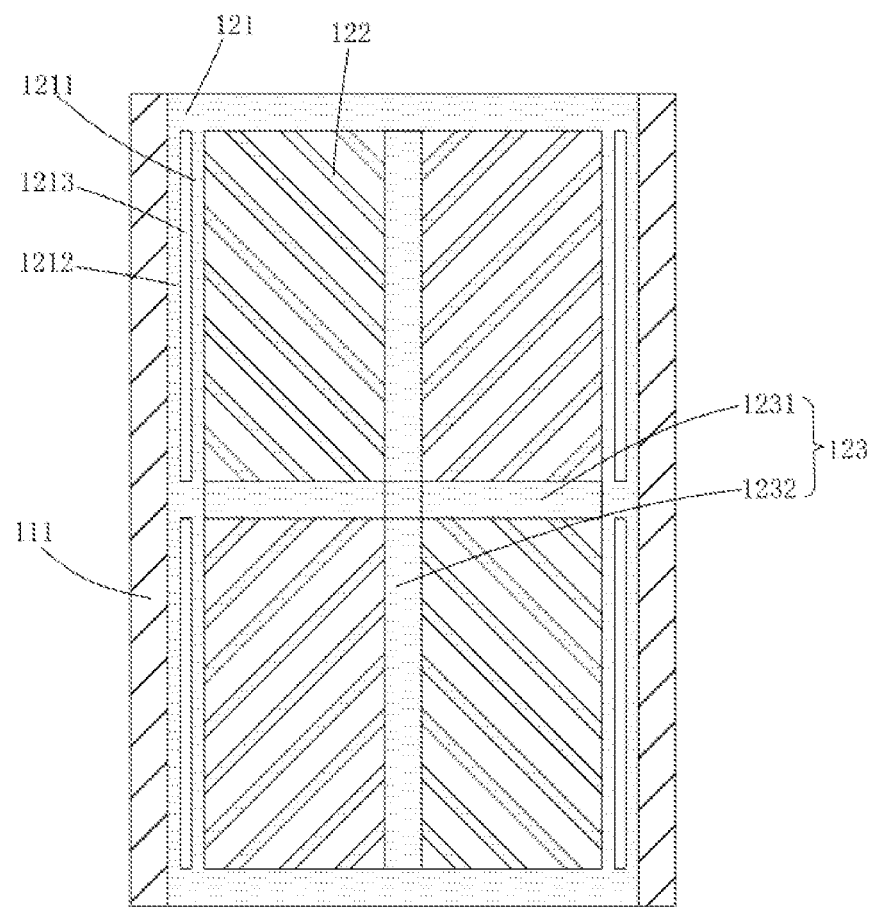

Referring to FIG. 4, in an embodiment, the pixel electrode 120 further includes a main stem 123. Both sides of the main stem 123 is connected with the branches 122. The main stem 123 divides the pixel electrode 120 into multiple domains, so that there are multiple domains in one sub-pixel. Extension directions of the branches 122 in the domains are different. Therefore, when a voltage is applied, the tilt directions of the liquid crystal molecules 300 in each domain are different. Therefore, the liquid crystal molecules 300 in one sub-pixel have multiple tilt directions. In this way, it is more conducive to the wide viewing angle display of the display panel.

The frame 121 corresponding to the domain of the sub-pixel defines a through hole 1213. Therefore, the frame 121 corresponding to the domain may be divided into the first side portion 1211 and the second side portion 1212 through the through hole 1213, so that the shading phenomenon may be effectively improved in the domain of the sub-pixel. When the frame 121 corresponding to each domain defines a through hole 1213, the dark line phenomenon may be effectively improved in each domain, and thus the edge dark line in the entire sub-pixel may be effectively suppressed.

Continuing to refer to FIG. 4, in an embodiment, the through hole 1213 in a part of the frame 121 corresponding to the domain of the sub-pixel has the same length as the part of the frame 121. Therefore, the part of the frame 121 corresponding to the domain includes a first side portion 1211 and a second side portion 1212. The branches 122 in this domain are all isolated from the second side portion 1212 by the through hole 1213, so that the generation of dark lines may be effectively suppressed in the entire domain.

The embodiment of this application does not limit a number of through hole 1213, which may be one or greater than one. When the number of through hole 1213 is greater than one, one domain may correspond to one through hole 1213, or one domain may correspond to multiple through holes 1213, which is not limited in this application.

In an embodiment, the through hole 1213 is arranged opposite to the branches 122, so that the dark lines around each branch 122 may be effectively improved. The through hole 1213 is arranged opposite to the branches 122. It may be a through hole 1213 is arranged opposite to the corresponding branch 122 (refer to FIG. 3), or it may be a through hole 1213 is arranged opposite to the corresponding branches 122 (refer to FIG. 2 or 4), and so on.

In an embodiment of this application, when the number of the through hole 1213 is greater than one, and the first common electrode 110 further includes a capacitor plate 112 connected to the shield plate 111, a part of the frame 121 between the through holes 1213 may further be configured to forms a storage capacitor with the capacitor plate 112. Therefore, the capacity of the storage capacitor may be increased on the basis of the storage capacitor formed by the capacitor plate 112 and the second side portion 1212.

In an embodiment, the number of through hole 1213 is greater than one. Each through hole 1213 located on both sides of the first side portion 1211 has the same distance from the corresponding branch 122, that is, the first side portion 1211 corresponding to each through hole 1213 has the same width. Therefore, it is beneficial to uniformize the improvement of dark lines around each branch 122.

In an embodiment, the number of through hole 1213 is greater than one. The distance between the first side portion 1211 and the second side portion 1212 located on both sides of each through hole 1213 is the same, that is, the width of each through hole 1213 is the same. Therefore, each through hole 1213 may have the same effect on the electric field isolation on the shield plate 111, which is also conducive to uniform display.

In an embodiment of this application, when the number of the through hole 1213 is greater than one, each through hole 1213 and the first side portion 1211 corresponding to each through hole 1213 may be provided with the same width. At this time, the improvement of dark lines around each branch 122 may be made more uniform. Certainly, this application is not limited to this, and each through hole 1213 and the first side portion 1211 corresponding to each through hole 1213 may have a different width, or both may have different widths.

In an embodiment, as shown in FIGS. 1 and 4, the array substrate 100 includes a first common electrode 110 and a pixel electrode 120. The first common electrode 110 includes a shield plate 111 and a capacitor plate 112 connected to each other. The shield plate 111 is opposite to the second common electrode 210 between the sub-pixels, so that the liquid crystal molecules 300 between the two are shielded from light to display a dark state. The pixel electrode 120 includes a frame 121, a main stem 123 and a branch 122.

The frame 121 is connected to and surrounds the main stem 123 and the branch 122. In addition, the frame 121 includes a first side portion 1211, a second side portion 1212 and a plurality of through holes 1213. The first side portion 1211 and the second side portion 1212 are separated from two opposite sides of the through hole 1213.

The first side portion 1211 is connected to the branch 122. The second side portion 1212 is located between the first side portion 1211 and the shield plate 111, so that the electric field of the shield plate 111 mainly affects the electric field on the second side portion 1212, and has little influence on the branch 122 connected to the first side portion 1211 which is separated from the second side portion 1212 (through the through hole 1213), thereby improving the edge dark line near the branch 122.

The second side portion 1212 and the capacitor plate 112 form a storage capacitor. The storage capacitor maintains the voltage on the pixel electrode 120 during the display process.

The main stem 123 includes a first stem 1231 and a second stem 1232. The first stem 1231 crosses the second stem 1232 and divides an inner area of the pixel electrode 120 into four domains of equal size. The branches 122 are distributed in each domain and connect the main stem 123 and the frame 121. The length directions of the branches 122 in each domain are different. The angles between the extension directions of the branches 122 in the four domains and a main stem 123 (for example, the first stem 1231) may be ±45° and ±135°, respectively. At this time, when a voltage is applied, the tilt directions of the liquid crystal molecules 300 in the four domains are all different. The liquid crystal molecules 300 in one sub-pixel have four tilt directions. Each domain may have a plurality of branches 122, and there may be a fixed interval between the plurality of branches 122 in a domain.

To sum up, according to the array substrate provided by this application, the second side portion of the frame of the pixel electrode is located between the first side portion and the shield plate. While the first side portion connected to the branch is separated from the second side portion. Therefore, the electric field of the shield plate mainly affects the electric field on the second side portion, which effectively reduces the influence of the electric field of the shield plate on the electric field on the branch configured to make the liquid crystal molecules transmit light, thereby effectively improving the edge shadow phenomenon.

The technical features of the above embodiments can be combined arbitrarily. In order to make the description concise, all possible combinations of the technical features in the above embodiments are not described. However, as long as there is no contradiction between the combinations of these technical features, they should be considered as the range described in this specification.

The above-mentioned embodiments only express several implementation manners of this application, and the description is relatively specific and detailed, but it should not be understood as a limitation on the scope of this application. It should be pointed out that for those of ordinary skill in the art, without departing from the concept of this application, several modifications and improvements can be made, and these all fall within the protection scope of this application. Therefore, the scope of protection of the patent of this application shall be subject to the appended claims.

What is claimed is:

1. An array substrate, comprising:
a first common electrode, comprising a shield plate; and
a pixel electrode, insulated from the first common electrode and comprising a frame surrounded by an orthographic projection of the shield plate and a branch surrounded by the frame, the branch being connected to the frame, the frame comprising a first side portion and a second side portion separated from each other, the first side portion being connected to the branch, the second side portion being located between the first side portion and the shield plate;
wherein the frame defines a plurality of through holes, and the first side portion and the second side portion are located on two opposite sides of the through holes;
one through hole is arranged opposite to one corresponding branch;
each through hole located on two sides of the first side portion has a same distance from a corresponding branch;
a distance between the first side portion and the second side portion located on both sides of each through hole is the same; and
each through hole and the first side portion corresponding to each through hole are provided with the same width.

2. The array substrate of claim 1, wherein the first common electrode further comprises a capacitor plate connected to the shield plate, and a storage capacitor is formed by the capacitor plate and the second side portion.

3. The array substrate of claim 1, wherein the pixel electrode further comprises a main stem, two sides of the main stem is connected with the branch, an internal area of the pixel electrode is divided into a plurality of domains by the main stem, extension directions of branches in the plurality of domains are different, and a frame corresponding to each of the plurality of domains defines the through hole.

4. The array substrate of claim 3, wherein the through hole in the frame corresponding to each of the plurality of domains has a same length as the frame.

5. The array substrate of claim 3, wherein one of the plurality of domains corresponds to one through hole.

6. The array substrate of claim 3, wherein one of the plurality of domains corresponds to a plurality of through holes.

7. The array substrate of claim 1, wherein only a part of the frame is surrounded by the shield plate.

8. The array substrate of claim 1, wherein all of the frame is surrounded by the shield plate.

9. The array substrate of claim 1, wherein the first common electrode further comprises a capacitor plate connected to the shield plate, and a part of the frame between each through hole is configured to form a storage capacitor with the capacitor plate.

10. The array substrate of claim 9, wherein the second side portion is further configured to form a storage capacitor with the capacitor plate.

11. An array substrate, comprising:
- a first common electrode, comprising a shield plate and a capacitor plate connected to each other; and
- a pixel electrode, insulated from the first common electrode and comprising a frame, a main stem, and a branch, the main stem and the branch being connected to the frame and surrounded by the frame;
- wherein the frame comprises a first side portion, a second side portion, and a plurality of through holes, the first side portion and the second side portion are located on two opposite sides of each of the plurality of through holes, the first side portion is connected to the branch, the second side portion is located between the first side portion and the shield plate, and a storage capacitor is formed by the second side portion and the capacitor plate;
- one through hole is arranged opposite to one corresponding branch;
- each through hole located on two sides of the first side portion has a same distance from a corresponding branch; and
- a distance between the first side portion and the second side portion located on both sides of each through hole is the same; and
- wherein the main stem comprises a first stem and a second stem, the first stem is crossed with the second stem to divide an internal area of the pixel electrode into four domains of equal size; the branch is distributed in each of the four domains and connected to the main stem and the frame, and extension directions of branch in the four domains are different.

12. A display panel, comprising:
- a liquid crystal molecule, a color film substrate and an array substrate;
- wherein the array substrate comprises:
- a first common electrode, comprising a shield plate; and
- a pixel electrode, insulated from the first common electrode and comprising a frame surrounded by an orthographic projection of the shield plate and a branch surrounded by the frame, the branch being connected to the frame, the frame comprising a first side portion and a second side portion separated from each other, the first side portion being connected to the branch, the second side portion being located between the first side portion and the shield plate;
- wherein the frame defines a plurality of through holes, and the first side portion and the second side portion are located on two opposite sides of the through holes;
- one through hole is arranged opposite to one corresponding branch;
- each through hole located on two sides of the first side portion has a same distance from a corresponding branch;
- a distance between the first side portion and the second side portion located on both sides of each through hole is the same;
- each through hole and the first side portion corresponding to each through hole are provided with the same width; and
- wherein the array substrate is arranged opposite to the color filter substrate, the liquid crystal molecule is located between the color filter substrate and the array substrate, the color filter substrate comprises a second common electrode, and the second common electrode is equipotential with the first common electrode.

* * * * *